United States Patent [19]

Geerts et al.

[11] Patent Number: 5,496,781
[45] Date of Patent: Mar. 5, 1996

[54] METALLOCENE CATALYST SYSTEMS, PREPARATION, AND USE

[75] Inventors: Rolf L. Geerts; Syriac J. Palackal; Ted M. Pettijohn, all of Bartlesville; Robert M. Infield, Barnsdall, all of Okla.

[73] Assignee: Phillips Petroleum Company, Bartlesville, Okla.

[21] Appl. No.: 242,901

[22] Filed: May 16, 1994

[51] Int. Cl.[6] .......................... C08F 4/602; C08F 4/605
[52] U.S. Cl. .......................... 502/104; 502/107; 502/118; 502/117; 502/132; 526/132; 526/142; 526/153
[58] Field of Search ................................ 502/104, 103, 502/125, 107, 117, 118, 132

[56] References Cited

U.S. PATENT DOCUMENTS

| | | | |
|---|---|---|---|
| 3,242,099 | 3/1966 | Manyik | 252/429 |
| 4,701,432 | 10/1987 | Welborn | 502/113 |
| 4,791,180 | 12/1988 | Turner | 526/160 |
| 4,794,096 | 3/1989 | Ewen | 502/117 |
| 4,874,734 | 10/1989 | Kioka et al. | 502/104 |
| 5,001,244 | 3/1991 | Welborn | 556/179 |
| 5,057,475 | 10/1991 | Canich et al. | 502/104 |
| 5,091,352 | 2/1992 | Kioka et al. | 502/103 |
| 5,093,295 | 3/1992 | Tomotsu et al. | 502/152 |
| 5,132,381 | 7/1992 | Winter et al. | 526/160 |
| 5,171,799 | 12/1992 | Kioka et al. | 526/153 |
| 5,354,721 | 10/1994 | Geerts | 502/117 |
| 5,411,925 | 5/1995 | Geerts et al. | 526/133 |

FOREIGN PATENT DOCUMENTS

| | | | |
|---|---|---|---|
| 60-130604 | 7/1985 | Japan | 526/153 |
| 63-168407 | 7/1988 | Japan | 526/153 |
| 2-22307 | 1/1990 | Japan | 526/153 |
| 5-295021 | 11/1993 | Japan . | |
| WO-A-93/16116 | 8/1993 | WIPO . | |

OTHER PUBLICATIONS

"Metallocene–Methylaluminoxane Catalysts for Olefin Polymerization. I. Trimethylaluminum as Coactivator", Chien and Wang, Journal of Polymer Science: Part A: Polymer Chemistry, vol. 26, 3089–3102 (1988).

"[13]C–Enriched End Groups of Polypropylene and Poly(1–butene) Prepared in the Presence of Bis(cyclopentadienyl)titanium Diphenyl and Methylalumoxane", Zambelli et al., Macromolecules, vol. 19, No. 11, 1986.

*Primary Examiner*—Edward J. Smith
*Attorney, Agent, or Firm*—Richmond, Phillips, Hitchcock & Fish

[57] ABSTRACT

In accordance with the present invention, there is provided catalyst systems and processes for preparing such catalyst systems comprising reacting a metallocene compound, a solid organoaluminoxy product, and an organometal compound. Further there is provided processes for the polymerization of olefins using the catalyst systems.

23 Claims, No Drawings

5,496,781

METALLOCENE CATALYST SYSTEMS, PREPARATION, AND USE

The present invention relates to metallocene catalyst systems, their preparation, and their use in polymerizing olefins.

BACKGROUND OF THE INVENTION

In the production of polyolefins, such as for example polyethylene, an important aspect of the various processes and catalysts used to produce such polymers is the productivity. By productivity is meant the amount of solid polymer that is obtained by employing a given quantity of catalyst. If the productivity is high enough, then the amount of catalyst residues contained in the polymer is low enough that the presence of the catalyst residues does not significantly affect the properties of the polymer, and the polymer does not require additional processing to remove the catalyst residues. As those skilled in the art are aware, removal of catalyst residues from polymer is an expensive process. It is thus desirable to employ a catalyst which provides sufficient productivity that catalyst residue removal is not necessary.

Another important aspect in the production of polyolefins, is the rate of incorporation of comonomer during polymerization. A low rate of comonomer incorporation requires the presence of higher concentrations of comonomer during polymerization to produce a polymer having the desired density. Unreacted comonomer residue causes odor problems in the polymer and higher production costs. Increasing the rate of comonomer incorporation would allow a lower comonomer concentration during polymerization, which would mean a lower cost in reactants and in comonomer removal and/or recycling.

It would therefore be desirable to produce a catalyst system which provides sufficient productivity that catalyst residue removal is not necessary. It would also be desirable to prepare a catalyst system that is capable of incorporating comonomer at efficient levels.

SUMMARY OF THE INVENTION

An object of this invention is to provide catalyst systems having relatively high productivity.

Another object of this invention is to provide simple and inexpensive processes for preparing catalyst systems capable of producing relatively high comonomer incorporation.

Another object of the invention is to provide polymerization processes in which the polymer produced contains catalyst residues in an amount so that catalyst residue removal is unnecessary.

In accordance with the invention a process is provided for preparing a catalyst system comprising reacting a metallocene compound, a solid organoaluminoxy product, and an organometal compound represented by the formula $R_mEX_n$, where R is a hydrocarbyl radical having 1 to 20 carbon atoms; E is Mg, Al, B, Ga, or Zn; X is hydride, halide, —OR' wherein R' is an alkyl radical containing 1 to 8 carbon atoms, or amide; m is 1 to 3; n is 0 to 2; and m plus n equals the valence of E.

In accordance with other aspects of the invention the catalyst system and processes for the polymerization of mono-1-olefins employing the catalyst system are provided.

DETAILED DESCRIPTION OF THE INVENTION

The catalyst system is prepared by reacting a metallocene compound, a solid organoaluminoxy product, and an organometal compound. Suitable metallocene compounds that can be employed include any metallocene compounds known in the art. Examples of suitable metallocene compounds, their preparation, and their use in polymerization processes are described in detail in U.S. Pat. Nos. 5,091,352; 5,057,475; 5,124,418; and EP 524,624 published Jan. 27, 1993, the disclosures of which are herein incorporated by reference.

Metallocene compounds, as used herein, are compounds which contain a transition metal and at least one cyclopentadienyl-type radical. The term cyclopentadienyl-type radicals, as used herein, includes unsubstituted cyclopentadienyl, substituted cyclopentadienyl, unsubstituted indenyl, substituted indenyl, unsubstituted fluorenyl, and substituted fluorenyl. The substituents can be, for example hydrocarbyl radicals containing 1 to 12 carbon atoms, alkoxy radicals containing 1 to 12 carbon atoms, or a halide. Typical hydrocarbyl radicals include methyl, ethyl, propyl, butyl, amyl, isoamyl, hexyl, isobutyl, heptyl, octyl, nonyl, decyl, dodecyl, 2-ethylhexyl, and phenyl. Preferably the hydrocarbyl radicals are alkyl radicals containing 1 to 10 carbon atoms, and more preferably 1 to 6 carbon atoms. The metallocene compound can contain one, two, three or four cyclopentadienyl-type radicals, preferably two. The transition metal is a Group IVB or VB metal, preferably titanium, zirconium, hafnium, or vanadium, and more preferably zirconium or hafnium.

It is also within the scope of the present invention to have two cyclopentadienyl-type radicals which are bonded together by a suitable bridging group containing a bridging element such as carbon, silicon, germanium, and tin. Some examples of such bridged ligands include bis(cyclopentadienyl)methane, bis(indenyl)methane, bis(fluorenyl)ethane, (9-fluorenyl)(cyclopentadienyl)methane, (9-fluorenyl)(cyclopentadienyl)dimethylmethane, 1,2-bisindenylethane, and the like.

Metallocene compounds also include those containing two cyclopentadienyl-type radicals where only one of such radicals is bonded to the transition metal. An example would be (9-fluorenyl)(cyclopentadienyl)methane zirconium trichloride.

Examples of suitable metallocene compounds include bis(cyclopentadienyl)zirconium dichloride, bis(cyclopentadienyl)zirconium dibromide, bis(cyclopentadienyl)zirconium diiodide, bis(methylcyclopentadienyl)zirconium dichloride, bis(n-butylcyclopentadienyl)zirconium/dichloride, bis(cyclopentadienyl)hafnium dichloride, bis(cyclopentadienyl)hafnium dibromide, bis(cyclopentadienyl)hafnium diiodide, bis(methylcyclopentadienyl)hafnium dichloride, bis(n-butylcyclopentadienyl)hafnium/dichloride, bis(cyclopentadienyl)titanium dichloride, bis(methylcyclopentadienyl)titanium dichloride, bis(n-butylcyclopentadienyl) titanium dichloride, bis(cyclopentadienyl)zirconium methyl chloride, bis(methylcyclopentadienyl)zirconium ethyl chloride, bis(n-butylcyclopentadienyl)zirconium/phenyl chloride, bis(cyclopentadienyl) hafnium methyl chloride, bis(methylcyclopentadienyl)hafnium ethyl chloride, bis(n-butylcyclopentadienyl)hafnium phenyl chloride, bis(cyclopentadienyl)titanium/methyl chloride, bis(methylcyclopentadienyl)titanium ethyl chloride, bis(n-butylcyclopentadienyl)titanium phenyl chloride, bis(cyclopentadienyl)zirconium/dimethyl, bis(methylcyclopentadienyl)zirconium dimethyl, bis(n-butylcyclopentadienyl)zirconium/dimethyl, bis(cyclopentadienyl)hafnium dimethyl, bis(methylcyclopentadienyl)hafnium dimethyl, bis(n-butylcyclopentadienyl)hafnium/dimethyl, bis(cyclopentadienyl)titanium dimethyl, bis(methylcyclopentadienyl)titanium dimethyl, bis(n-butylcyclopentadienyl)titanium/dimethyl, pentamethylcyclopentadienyl titanium trichloride, pentaethylcyclopentadienyl zirconium trichloride, pentaethylcyclopentadienyl hafnium trichloride, bis(pentamethylcyclopentadienyl)titanium diphenyl, (9-fluorenyl)(cyclopentadienyl)methane zirconium dichloride, (9-fluorenyl)(cyclopentadienyl)dimethyl methane zirconium dichloride, bis(indenyl) hafnium dichloride, bis(indenyl)titanium diphenyl, bis(indenyl)zirconium dichloride, (9-fluorenyl)(cyclopentadienyl)methane zirconium trichloride and the like.

Various techniques are known for making organoaluminoxanes. One technique involves the controlled addition of water to a trialkylaluminum. Another technique involves combining a trialkylaluminum and a hydrocarbon with a compound containing water of adsorption or a salt containing water of crystallization. The present invention is considered applicable to any of the commercially available organoaluminoxanes.

Typically the organoaluminoxanes comprise oligomeric, linear and/or cyclic hydrocarbyl aluminoxanes having repeating units of the formula

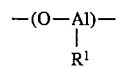

Typically the linear aluminoxanes are represented by the formula:

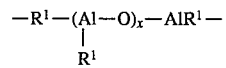

The oligomeric, cyclic aluminoxanes can be represented by the formula:

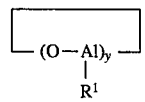

wherein each $R^1$ is a hydrocarbyl radical, preferably an alkyl radical containing 1–8 carbon atoms, x is 2 to 50, preferably 4 to 40, y is 3 to 50, preferably 4 to 40. Generally the aluminoxanes are more active when x and y are greater than 4, more preferably 10 to 40. Typically $R^1$ is predominantly methyl or ethyl. Preferably at least about 30 mole percent of the repeating groups have an $R^1$ which is methyl, more preferably at least 50 mole percent, and still more preferably at least 70 mole percent. Generally in the preparation of an organoaluminoxane, a mixture of linear and cyclic compounds is obtained. Organoaluminoxanes are commercially available in the form of hydrocarbon solutions, generally aromatic hydrocarbon solutions.

Solid organoaluminoxy product is prepared by reacting an organoaluminoxane and an oxygen-containing compound selected from the group consisting of organo boroxines, organic borates, organic peroxides, alkaline oxides, and organic carbonates. Organo boroxines are preferred.

Organo boroxine compounds useful in the invention are represented by the formula $(R^2BO)_3$ wherein each $R^2$ is selected from the group consisting of hydrocarbyl radicals containing 1 to 25 carbon atoms, preferably 1 to 10 carbon atoms, R"O—, R"S—, R"$_2$N—, R"$_2$P—, and R"$_3$Si— wherein each R" is a hydrocarbyl radical containing 1 to 10 carbon atoms.

Hydrocarbyl boroxines and hydrocarbyloxy boroxines are preferred. Examples of hydrocarbyl boroxines include trimethyl boroxine, triethyl boroxine, tri-n-propyl boroxine, tributyl boroxine, tricyclohexyl boroxine, triphenyl boroxine, methyl diethyl boroxine, dimethylethyl boroxine, and mixtures thereof. The currently preferred hydrocarbyl boroxines are trimethyl boroxine and triethyl boroxine.

The term hydrocarbyloxy boroxine refers to compounds of the formula (R"OBO)$_3$ wherein each R" can be the same or different hydrocarbyl group containing 1 to 10 carbon atoms. Trialkyloxy boroxines are currently preferred and trimethoxy boroxine is especially preferred.

Organic borane compounds useful in the invention contain a functionality represented by the formula

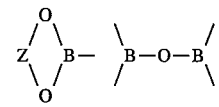

where Z is a bridging unit between the two oxygen atoms selected from the group consisting of $(CR^3_2)_q$, arylene, and $(YR^3_s)_q$, wherein each $R^3$ is individually selected from hydrogen and hydrocarbyl radicals, preferably aryl or alkyl radicals having 1 to 20 carbon atoms; s and q are integers preferably in the range of 1 to 10; and each Y is individually selected from C, Si, Ge, Sn, B, Ga, In, P, As, and Sb with the proviso that at least one Y is not C. Some specific examples include catechol borane, diphenyl borinic anhydride, dibutyl borinic anhydride, trimethylene borate, methyl catechol borane, and mixtures thereof.

Organic peroxides useful in carrying out the invention are represented by the formula $R^4OOR^5$, wherein $R^4$ and $R^5$ are individually selected from hydrogen, hydrocarbyl, and hydrocarbonyl radicals selected from the group consisting of alkyl, cycloalkyl, aryl, alkenyl, and alkynyl radicals containing 1 to 24 carbon atoms, preferably 1 to 18 carbon atoms and more preferably 1 to 12 carbon atoms, with the proviso that at least one of $R^4$ and $R^5$ is a hydrocarbyl or hydrocarbonyl radical. Preferably both $R^4$ and $R^5$ are individually hydrocarbyl radicals.

Examples of suitable peroxides include diethyl peroxide, diacetyl peroxide, tert-butyl hydroperoxide, di-tert-butyl peroxide, 2,5-dimethyl-(2,5-di(tert-butylperoxy)hexane, tert-amyl hydroperoxide, di-tert-amyl peroxide, dibenzoyl peroxide, dicrotonyl peroxide, bis(1-methyl-1-phenylethyl) peroxide, dilauryl peroxide, peroxybenzoic acid, peroxyacetic acid, tert-butyl perbenzoate, tert-amyl perbenzoate, peroxybutyric acid, peroxycinnamic acid, tert-butyl peracetate, and the like and mixtures thereof. Excellent results have been obtained with di-tert-butyl peroxide and it is preferred.

Suitable alkylene oxides contain the following functionality

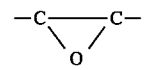

Examples of alkylene oxides which are useful include ethylene oxide, propylene oxide, 2,2-dimethyloxirane, 1,2-dimethyloxirane, 1,2-diethyloxirane, cyclohexene oxide, 1-methylcyclohexene oxide, and mixtures thereof. Alkylene oxides containing a total of 2 to 16 carbon atoms are preferred, more preferably 2 to 12 carbon atoms. Propylene oxide is especially preferred.

Other suitable alkylene oxides include glycidyl ethers. Examples of suitable glycidyl ethers include glycidyl isopropyl n-butyl ether, glycidyl tert-butyl ether, 2,2-dimethyl-1,3-propanediol diglycidyl ether, and 1,4-butanediol diglycidyl ether.

Organic carbonates useful in carrying out the invention contain the following functionality

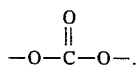

Examples of suitable organic carbonates include 1,3-dioxolan-2-one(commonly named ethylene carbonate), 4-methyl-1,3-dioxolan-2-one (commonly named propylene carbonate), 4,5-dimethyl-1,3-dioxolan-2-one, 4-(1-butyl)-1,3-dioxolan-2-one, 4,5-di(1-propyl)-1,3-dioxolan-2-one, dimethyl carbonate, diethyl carbonate, bis(2-methylallyl) carbonate, dibenzyl carbonate, and diphenyl carbonate, and mixtures thereof. Preferred organic carbonates are those wherein the carbonyldioxy radical is attached to a terminal carbon atom and the carbon adjacent thereto. Propylene carbonate is especially preferred.

The amount of oxygen-containing compound employed relative to the organoaluminoxane is the amount sufficient to produce a solid organoaluminoxy product from an aromatic hydrocarbon solution and can vary over a wide range depending upon the particular compounds employed and the results desired. The molarity of an organoaluminoxane solution can be approximated by vacuum stripping the solvent from a known volume of aluminoxane solution, weighing the recovered solid, and multiplying the weight of the solid in grams per milliliter by 1000 and dividing by the average molecular weight of the aluminoxy units, (i.e. 58 for methylaluminoxane). It is presumed that the vacuum stripping removes a substantial portion of any free trialkylaluminum compound.

Generally the amount of organoaluminoxane is in the range of from about one mole to about 1000 moles per mole of oxygen-containing compound, preferably about 2 moles to about 500 moles, and more preferably from 5 moles to 200 moles per mole of oxygen-containing compound. When employing propylene carbonate as the oxygen-containing compound, a particularly preferred range is from about 20 moles to about 200 moles of organoaluminoxane per mole of propylene carbonate.

The conditions for contacting the oxygen-containing compound and the organoaluminoxane are those sufficient to produce a solid product and can vary widely depending upon the particular compounds employed. Generally the temperature will be in the range of from about 0° C. to about 100° C., preferably from about 10° C. to about 100° C., and more preferably from 10° C. to 75° C. Generally the pressure will be in the range of from about 0 psig to about 100 psig, preferably about 0 psig to about 50 psig. The time of reaction will generally be in the range of from about 1 minute to about 72 hours, preferably about 5 minutes to about 30 hours.

The reaction of the oxygen-containing compound and the organoaluminoxane can be carried out in any suitable manner. Typically the reactants will be contacted in a suitable liquid diluent. A preferred technique involves contacting a hydrocarbon solution of the aluminoxane with a countersolvent to produce a slurry comprising soluble aluminoxane and insoluble aluminoxane and then contacting the resulting slurry with a solution of the oxygen-containing compound. One example is to mix a toluene solution of methylaluminoxane with hexane to form a slurry and then contacting the oxygen-containing compound and the slurry.

It is also within the scope of the present invention to carry out the reaction of the oxygen-containing compound and the aluminoxane in the presence of a particulate diluent so that the insoluble product becomes deposited upon the particulate diluent. Typical particulate diluents include such inorganic materials as silica, alumina, aluminum phosphate, silica-alumina, titania, kaolin, fumed silica, and the like.

The amount of solid organoaluminoxy product relative to the metallocene compound can vary broadly depending upon the particular catalyst selected and the results desired. Typically, the solid organoaluminoxy product will be present in the amount of about 50 moles to about 10,000 moles per mole of metallocene compound, preferably about 100 moles to about 10,000 moles, and more preferably 100 moles to 7,5000 moles.

The organometal compound is represented by the formula $R_mEX_n$, where R is a hydrocarbyl radical having 1 to 20 carbon atoms; E is Mg, Al, B, Ga, or Zn; X is hydride, halide, —OR' wherein R' is an alkyl radical containing 1 to 8 carbon atoms, or amide; m is 1 to 3; n is 0 to 2; and m plus n equals the valence of E. Many suitable organometal compounds are commercially available. Examples of suitable organometal compounds include dibutylmagnesium, butylmagnesium hydride, butylmagnesium chloride, diethylmagnesium, dioctylmagnesium, dihexadecylmagnesium, dimethylaluminum bromide, diethylaluminum hydride, diethylaluminum ethoxide, diethylaluminum chloride, ethylaluminum dichloride, triethylboron, trihexylboron, dibutylboron chloride, triphenyl boron, triphenylgallium, triethylgallium, methylgallium hydride, methylgallium dichloride, dimethylgallium amide, diethylzinc, diphenylzinc, methylzinc methoxide, ethylzinc iodide, and phenylzinc chloride. Organoaluminum compounds are preferred and trialkylaluminum compounds wherein each alkyl radical contains from 1 to 10 carbon atoms are especially preferred. Typical examples include, trimethylaluminum, triethylaluminum, triisopropylaluminum, tridecylaluminum, trieicosylaluminum, tricyclohexylaluminum, 2-methylpentyldiethylaluminum, and mixtures thereof. Trimethylaluminum and triethylaluminum have produced excellent results and they are most preferred.

The moles of organometal compound per mole of metallocene compound can vary broadly depending on the particular compounds employed and the desired results. Generally the organometal compound will be present in an amount in the range of from about 1 mole to about 500 moles per mole of metallocene compound, preferably from about 25 moles to about 500 moles, and more preferably from 50 moles to 250 moles.

The metallocene compound, the solid organoaluminoxy product, and the organometal compound can be contacted in any order. Preferably the metallocene compound and the solid organoaluminoxy product are contacted prior to contacting with the organometal compound.

The conditions for contacting the metallocene compound, the solid organoaluminoxy product, and the organometal compound are those sufficient to produce an active catalyst system and can vary widely depending upon the particular compounds employed. Generally the temperature will be in the range of from about 0° C. to about 2000° C., preferably from about 10° C. to about 150° C., and more preferably from 10° C. to 125° C.

When employing bisfluorenyl-type metallocene compounds, such as bis(fluorenyl)ethane zirconium dichloride, especially preferred temperatures include the temperature ranges of from about 35° C. to about 200° C., preferably from about 40° C. to about 150° C., and more preferably from 40° C. to 125° C.

The contacting time for contacting the metallocene compound, the solid organoaluminoxy product, and the organometal compound can also vary broadly, but generally will be in the range of from 1 minute to about 48 hours, preferably from about 10 minutes to about 24 hours, and more preferably from 30 minutes to 15 hours.

A variety of olefin compounds are suitable for use as monomers in the polymerization process of the present invention. Olefins which can be employed include aliphatic mono-1-olefins. While the invention would appear to be suitable for use with any aliphatic mono-1-olefin, those olefins having 2 to 18 carbon atoms are most often used. Ethylene is especially preferred. Often a second mono-1-olefin (comonomer) having from 2 to 12 carbon atoms, preferably from 4 to 10 carbon atoms can be employed. Preferred comonomers include 1-butene, 1-pentene, 4-methyl-1-pentene, 1-hexene, and 1-heptene. Of these 1-hexene is most preferred.

It has been found that a catalyst system comprising bis(n-butylcyclopentadienyl)zirconium/dichloride, triethylaluminum, and methylaluminoxane reacted with methoxyboroxine is especially effective for copolymerizing ethylene and 1-hexene.

The reaction conditions for contacting the olefin and the catalyst system can vary broadly depending on the olefin employed, and are those sufficient to polymerize the mono-1-olefins. Generally the temperature is in the range of about 20° C. to about 200° C., preferably in the range of 50° C. to 150° C. The pressure is generally in the range of from about 0.5 MPa to about 5.0 MPa (70–725 psi).

The polymerization processes according to the present invention can be performed either batchwise or continuously. The olefin, metallocene compound, organometal compound, and solid organoaluminoxy product can be contacted in any order. The metallocene compound, the solid organoaluminoxy product, or the organometal compound can be charged to the reactor first or they can be charged simultaneously or they can be contacted in any order prior to charging to the reactor. In one embodiment, the metallocene compound and the solid organoaluminoxy product are contacted prior to contacting with the olefin. After closing the entry port, a diluent such as isobutane is added to the reactor. The reactor is heated to the desired reaction temperature and olefin, such as ethylene, is then admitted and maintained at a partial pressure within a range of from about 0.5 MPa to about 5.0 MPa (70–725 psi) for best results. At the end of the designated reaction period, the polymerization reaction is terminated and the unreacted olefin and diluent can be vented. The reactor can be opened and the polymer can be collected as a free-flowing white solid and dried to obtain the product.

The present invention is particularly useful in a particle form, or slurry type polymerization. A particularly preferred type particle form polymerization involves a continuous loop reactor which is continuously charged with suitable quantities of diluent, catalyst system, and polymerizable compounds in any desirable order. Typically the polymerization will include a higher alpha-olefin comonomer and optionally hydrogen. Generally the particle form polymerization would be conducted at a temperature in the range of about 60° C. to about 100° C., although higher and lower temperatures can be used. The reaction product can be continuously withdrawn and the polymer recovered as appropriate, generally by flashing the diluent and unreacted monomers and drying the resulting polymer.

The following examples will serve to show the present invention in detail by way of illustration and not by way of limitation.

EXAMPLE 1

Example 1 demonstrates the effectiveness of an inventive catalyst system in incorporating comonomer. The catalyst system comprised bis(n-butylcyclopentadienyl)zirconium/dichloride, triethylaluminum, and solid methylaluminoxy product.

Solid methylaluminoxy product was prepared by reacting methylaluminoxane (MAO) with trimethyoxyboroxine. MAO was obtained from Schering Corporation as 10 weight percent MAO in toluene solution. To a 10 gallon glass lined steel Pfaudler reactor, 6 gallons hexane and 7.25 lbs MAO were added and mixed for one hour. About 32 g trimethoxyboroxine dissolved in 300 mL toluene were added over a 1 hour period with stirring. The resulting slurry was stirred for an additional 6 hours. The solids were allowed to settle overnight. Excess hexane was decanted and the remaining solids were washed with 1 gallon hexane while stirring for 1 hour. Excess hexane was decanted and the thus produced solid MAO product was transferred to a carboy. Three batches of solid MAO were prepared as described above and combined.

The metallocene compound bis(n-butylcyclopentadienyl)zirconium dichloride was prepared by reacting n-butylcyclopentadienyllithium with zirconium tetrachloride. The n-butylcyclopentadienyllithium was prepared by reacting 0.6 g n-butylcyclopentadiene (0.0049 mole) dissolved in ether with 3 mL (0049 mole) n-butyllithium/hexane solution (1.6M) at 0° C. The milky-white viscous mixture was stirred for about 2 hours. Then 0.57 g $ZrCl_4$ (0.0024 mole) was slowly added to the slurry with vigorous stirring at 0° C. The mixture was stirred for about 2 hours and then the solvent was removed under vacuum. The solids were extracted with two 100 mL portions of hexane and filtered. The hexane volume was reduced and the resulting solution was cooled to $-10°$ C. and allowed to stand overnight. The colorless precipitate was collected and dried in vacuum. Three additional batches of metallocene were prepared as described above using the same relative amounts with the exception that different absolute amounts were used. The yields were 25% to 41% bis(n-butylcyclopentadienyl)zirconium dichloride. The thus produced metallocene compound was combined into a single sample of 5.8 g.

A first catalyst system was prepared by reacting the solid MAO product prepared as described above with the combined metallocene compound. The slurry was stirred to assure good mixing, the solids were allowed to settle and then transferred to a carboy.

A second catalyst system was prepared as follows. To a one liter glass bottle, 500 mL hexane and 60 g (1.03 moles) solid MAO product and 0.835 g (0.0027 moles) bis(n-butylcyclopentadienyl)zirconium dichloride in 100 mL hexane were added and stirred for 3 hours at room temperature. The solids were collected on a filter and dried in a dry box. The yield was 60 g catalyst system. The second catalyst system was combined with 140 g of the first catalyst system and the combined catalyst system was employed in polyethylene polymerizations.

Polymerizations were conducted in a 1-gallon stirred autoclave reactor under particle form conditions. The polymerizations were conducted at 80° C in 2 liters isobutane in the presence of hydrogen for one hour. The total pressure of ethylene and hydrogen was about 403 psig and the partial pressure of the hydrogen was about 15 psig. The polymerizations were conducted employing 70 mg catalyst. Triethylaluminum was added as indicated in Table 1. After the polymerization was complete, the isobutane was removed and the polymer collected as a dry fluff. The results are tabulated in Table 1. In Table 1, mm TEA is the millimoles triethylaluminum. Hexene is the g 1-hexene. Productivity is g polyethylene/(g catalyst•hour). Density is in g/cc run according to ASTM D 1505.

TABLE 1

| Run | TEA (mmols) | Hexene (grams) | Productivity (g PE/(g cat · hr)) | Density (g/cc) |
|---|---|---|---|---|
| 101 | 0 | 0 | 1930 | 0.9651 |
| 102 | 0.5 | 0 | 2370 | 0.9644 |
| 103 | 0 | 90 | 270 | 0.9556 |
| 104 | 0.5 | 90 | 6160 | 0.9352 |

Table 1 demonstrates the effectiveness of a catalyst system containing triethylaluminum in incorporating 1-hexene, as indicated by the relatively lower density, compared to a catalyst system where triethylaluminum was absent. Table 1 also demonstrates a significant improvement in productivity in the catalyst system containing triethylaluminum.

EXAMPLE 2

Example 2 demonstrates increased activity for a catalyst system prepared by reacting a bisfluorenyl metallocene, a solid MAO product, and trimethylaluminum.

Solid MAO product was prepared as follows. To 3.785 L (1.67M) toluene solution MAO (6.32 moles) in hexane from Ethyl Corporation was added 48.7 g (MeOBO)$_3$ (0.84 mole). The mixture was stirred and the solids were collected on a filter and dried. Yield was about 328 g. The thus prepared solid MAO product was screened through a 60 mesh screen.

The ligand bis(fluorenyl)ethane was prepared as follows. To 0.2 mole fluorene in 200 mL ether was added 0.2 mole butyllithium (1.6M in hexane) at a rate of 0.15 mL/min. at room temperature. The reaction mixture was stirred for one hour, and 0.1 mole 1,2 dibromoethane was added slowly and stirred for 3 hours. The volume was reduced to 150 mL, filtered and the pale yellow solid was washed 2 times with 50 mL distilled water. The pale yellow solid was dried and washed with 100 mL of pentane to yield white 1,2-bis(fluorenyl)ethane. The yield was 80%.

The metallocene bis(fluorenyl)ethane zirconium dichloride was prepared as follows. To 0.01 mole bis(fluorenyl)ethane in 125 mL hexane was added 0.02 mole methyllithium (1.4M in ether) at a rate of 0.15 mL/min. The reaction mixture was stirred for 30 minutes at room temperature and refluxed for 3 hours. The orange-red suspension was cooled to room temperature and 0.01 mole ZrCl$_4$ was added slowly and the mixture was stirred for 45 minutes. The reaction mixture was filtered and dried in vacuum. The red solid was extracted with CH$_2$Cl$_2$. The extract volume was reduced and cooled down to crystallize red colored bis(fluorenyl)ethane zirconium dichloride. The yield was 85%.

The metallocene, solid MAO product, and trimethylaluminum (TMA) were combined in the proportions shown and heated for the time and temperatures indicated in Table 2.

Polymerizations were conducted in a 1-gallon stirred autoclave reactor under particle form conditions. The polymerizations were conducted at about 70° C. in 2 liters isobutane in the presence of hydrogen for about one hour. The total pressure was about 341.2 psig and the partial pressure of the hydrogen was about 7.45 psig. After the polymerization was complete, the isobutane was removed and the polymer collected. The results are tabulated in Table 2. In Table 2, MAO Al/Zr is the ratio of Al in the MAO solid product to Zr. TMA Al/Zr is the ratio of Al in the TMA to Zr. Temp. is the temperature at which the metallocene, solid MAO product, and TMA were reacted. Time is the time the metallocene, solid MAO product, and TMA were reacted. Activity is shown in g polyethylene/g catalyst and g polyethylene/g Zr.

TABLE 2

| | MAO Al/Zr | Temp °C. | Time h | TMA Al/ZR | Activity g/g Cat | Activity g/g Zr |
|---|---|---|---|---|---|---|
| 1 | 100 | 40 | 1 | 0 | 720 | 49,996 |
| 2 | 100 | 40 | 1 | 100 | 12223 | 84,924 |
| 3 | 100 | 40 | 7 | 0 | 1445 | 100,321 |
| 4 | 100 | 40 | 7 | 100 | 2658 | 184,545 |
| 5 | 100 | 110 | 1 | 0 | 1745 | 121,144 |
| 6 | 100 | 110 | 1 | 100 | 4179 | 284,615 |
| 7 | 100 | 110 | 7 | 0 | 1695 | 117,666 |
| 8 | 100 | 110 | 7 | 100 | 3077 | 213,638 |
| 9 | 2550 | 75 | 4 | 50 | 410 | 655,600 |
| 10 | 2550 | 75 | 4 | 50 | 335 | 536,278 |
| 11 | 2550 | 75 | 4 | 50 | 313 | 501,093 |
| 12 | 5000 | 40 | 1 | 0 | 69 | 220,657 |
| 13 | 5000 | 40 | 1 | 100 | 135 | 432,040 |
| 14 | 5000 | 40 | 7 | 0 | 109 | 347,612 |
| 15 | 5000 | 40 | 7 | 100 | 163 | 519,981 |
| 16 | 5000 | 110 | 1 | 0 | 65 | 199,231 |
| 17 | 5000 | 110 | 1 | 100 | 309 | 987,837 |
| 18 | 5000 | 110 | 7 | 0 | 99 | 314,995 |
| 19 | 5000 | 110 | 7 | 100 | 165 | 528,291 |
| 20 | 550 | 75 | 4 | 50 | 1392 | 495,861 |
| 21 | 1550 | 75 | 4 | 50 | 637 | 633,497 |
| 22 | 2550 | 75 | 4 | 50 | 345 | 561,957 |
| 23 | 3550 | 75 | 4 | 50 | 251 | 539,126 |
| 24 | 4550 | 75 | 4 | 50 | 167 | 483,600 |

Table 2 demonstrates an improvement in activity when employing a catalyst system containing trimethylaluminum.

EXAMPLE 3

Example 3 demonstrates an improvement in activity when employing a catalyst system containing trimethylaluminum.

The ligand (cyclopentadienyl)(fluorenyl)methane was prepared as follows. To 0.4 mole dibromomethane dissolved in 200 mL pentane was added 0.2 mole fluorenyllithium powder. After the addition was complete, the reaction mixture was stirred for two hours. The reaction mixture was filtered and the filtrate washed with 100 mL of distilled water. The organic phase was dried with Na$_2$SO$_4$ and the solvent was stripped under vacuum. The residue was washed with 150 mL pentane to remove unreacted fluorene and dried under vacuum to yield pale yellow colored (bromo)(fluorenyl)methane. The yield was 80%. The (bromo)(fluorenyl)methane was dissolved in 20 mL ether and 19 mL (2M in THF) cyclopentadienylsodium was added at a rate of 0.15 mL/min. The reaction mixture was stirred for two hours and washed with 50 mL distilled water. The organic phase was dried over Na$_2$SO$_4$ and the solvent removed under vacuum to yield pale yellow (cyclopentadienyl)(fluorenyl)methane. The yield was 70%.

The metallocene (cyclopentadienyl)(fluorenyl)methane zirconium dichloride was prepared as follows. To 0.01 mole (cyclopentadienyl)(fluorenyl)methane in 125 mL hexane was added 0.02 mole methyllithium (1.4M in ether) at a rate of 0.15 mL/min. The reaction mixture was stirred for 30 minutes at room temperature and refluxed for 3 hours. An orange-red suspension was formed and was cooled to room temperature and 0.01 mole ZrCl$_4$ was added slowly and the mixture was stirred for 45 minutes. The reaction mixture was filtered and stripped to dryness in vacuum. The red solid was extracted with $CH_2Cl_2$. The extract volume was reduced and cooled to crystallize the red (cyclopentadienyl)(fluorenyl)methane zirconium dichloride. Yield was 60%.

The catalyst system in Run 301 was prepared as follows. To a 50 mL slurry of 1 g MAO precipitated in hexane (0.017 mole) was added 14 mg solid (cyclopentadienyl)(fluorenyl)methane zirconium dichloride. The pale red slurry was stirred. The solids were allowed to settle, washed 3 times with hexane and dried. In Run 301, 0.0673 g of the solid catalyst system was employed in the polymerization.

Solid MAO product in Run 302 was prepared as follows. To a stirred 20 mL toluene solution of 1.7M MAO (0.034 mole) from Ethyl Corporation was added 100 mL toluene. To this slurry was added 2 mL (0.189 g) toluene solution of $(MeBO)_3$ (0.00453 mole) dropwise. Initial vigorous reaction was evidenced by considerable fuming. Addition was completed over a ½ hour period. The slurry was stirred for 2 hours. The solids were collected on a filter and dried. The yield was 0.64 g.

The catalyst system in Run 302 was prepared by reacting 0.5 g of the above prepared solid MAO product (8.6 mmoles) slurried in 30 mL hexane and 1 mL of 2M toluene solution $Me_3Al$ (2 mmoles). The slurry was stirred overnight. The solids were collected on a filter and dried. The MAO solids were re-slurried in 30 mL hexane and 2.5 mL toluene solution of (cyclopentadienyl)(fluorenyl)methane zirconium dichloride (2.5 mg) was added. The slurry was stirred for 1 hour, the purple solid was collected on a filter and dried. Yield was 0.40 g. In Run 302, 0.0978 g of the solid catalyst system was employed in the polymerization.

Solid MAO product in Run 303 was prepared in the following manner. To a stirred 20 mL solution of MAO from Ethyl Corporation in toluene was added 100 mL hexane. To this slurry was added a 2 mL toluene solution of $(MeOBO)_3$ dropwise. A vigorous reaction occurred. Addition was completed over a ½ hour period. The thick white slurry was stirred for 2 hours. The solids were collected and dried. Yield was 1.45 g.

The catalyst system in Run 303 was prepared as described for Run 302 with the exception that the solid MAO product was prepared as described above employing $(MeOBO)_3$. In Run 303, 0.0947 g of the solid catalyst system was employed in the polymerization.

Polymerizations were conducted as described in Example 2. The results are summarized in Table 3. In Table 3, MAO Treatment represents the millimoles reagent used to prepare the solid MAO product. Yield is the yield polyethylene in g. MBO represents methylboroxine. MOBO represents methyoxyboroxine.

TABLE 3

| Run | MAO Treatment (mmoles) | TMA (mmol) | Yield (g) |
| --- | --- | --- | --- |
| 301 | hexane | 0 | 9.6 |
| 302 | 8.6 MBO | 2 | 29.5 |
| 303 | 8.6 MOBO | 2 | 56.9 |

That which is claimed is:

1. A process for preparing an olefin polymerization catalyst system comprising reacting a metallocene compound, a solid organoaluminoxy product, and an organometal compound represented by the formula $R_mEX_n$, where R is a hydrocarbyl radical having 1 to 20 carbon atoms, E is Mg, Al, B, Ga, or Zn, X is hydride, halide, —OR' wherein R' is an alkyl radical containing 1 to 8 carbon atoms, or —$NH_2$, m is 1 to 3, n is 0 to 2, and the sum of m plus n equals the valence of E;

wherein said solid organoaluminoxy product is prepared by reacting an organoaluminoxane and an oxygen-containing compound selected from the group consisting of organo boroxines, organic peroxides, alkylene oxides, and organic carbonates;

wherein said organoaluminoxane is represented by the formulas:

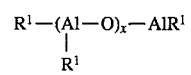

or

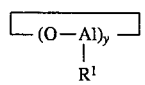

wherein each $R_1$ is a hydrocarbyl radical containing 1 to 8 carbon atoms, x is 2 to 50, and y is 3 to 50.

2. A process according to claim 1 wherein said organometal compound is an organoaluminum compound.

3. A process according to claim 2 wherein said organometal compound is a trialkylaluminum compound wherein each alkyl radical contains from 1 to 10 carbon atoms.

4. A process according to claim 3 wherein said organometal compound is trimethylaluminum or triethylaluminum.

5. A process according to claim 1 wherein said organometal compound is present in an amount in the range of from about 25 moles to about 500 moles per mole of metallocene compound.

6. A process according to claim 5 wherein said organometal compound is present in an amount in the range of from 50 moles to 250 moles per mole of metallocene compound.

7. A process according to claim 1 wherein said oxygen-containing compound is an organo boroxine compound represented by the formula $(R^2BO)_3$ wherein each $R^2$ is selected from the group consisting of hydrocarbyl radicals containing 1 to 25 carbon atoms, R"O—, R"S—, R"$_2$N—, R"$_2$P—, and R"$_3$Si—, wherein each R" is a hydrocarbyl radical containing 1 to 10 carbon atoms.

8. A process according to claim 7 wherein said organo boroxine compound is selected from the group consisting of hydrocarbyl boroxines and hydrocarbyloxy boroxines wherein each hydrocarbyl radical contains 1 to 10 carbon atoms.

9. A process according to claim 8 wherein said organo boroxine is trimethyl boroxine, triethyl boroxine or trimethoxy boroxine.

10. A process according to claim 1 wherein said solid organoaluminoxy product is present in an amount in the range of from about 50 moles to about 10,000 moles per mole of metallocene compound.

11. A process according to claim 10 wherein said solid organoaluminoxy product is present in an amount in the range of from about 100 moles to about 10,000 moles per mole of metallocene compound.

12. A process according to claim 11 wherein said solid organoaluminoxy product is present in an amount in the range of from 100 moles to 7,5000 moles per mole of metallocene compound.

13. A process according to claim 1 wherein said metallocene compound is bis(cyclopentadienyl)zirconium dichloride or bis(n-butylcyclopentadienyl) zirconium dichloride and said organometal compound is triethylaluminum.

14. A process according to claim 1 wherein said metallocene compound is (cyclopentadienyl)(fluorenyl)methane zirconium dichloride.

15. A process according to claim 1 wherein said metallocene compound is bis(fluorenyl)ethane zirconium dichloride.

16. A process according to claim 1 wherein said metallocene compound and said solid organoaluminoxy product are contacted at a temperature in the range of about 0° C. to about 200° C.

17. A process according to claim 16 wherein said metallocene compound and said solid organoaluminoxy product are contacted at a temperature in the range of from 35° C. to 200° C.

18. A process according to claim 17 wherein said metallocene compound and said solid organoaluminoxy product are contacted at a temperature in the range of from 40° C. to 125° C.

19. A process according to claim 1 wherein said metallocene compound and said solid organoaluminoxy product are contacted prior to contacting with said organometal compound.

20. A process for preparing an olefin polymerization catalyst system comprising reacting a metallocene compound, a solid organoaluminoxy product, and an organometal compound;

wherein said metallocene compound is selected from the group consisting of bis(cyclopentadienyl)zirconium dichloride, bis(n-butylcyclopentadienyl) zirconium dichloride, (cyclopentadienyl)(fluorenyl)methane zirconium dichloride, and bis(fluorenyl)ethane zirconium dichloride;

wherein said solid organoaluminoxy product is prepared by reacting methylaluminoxane and methylboroxine or methoxyboroxine; and wherein said organometal compound is trimethylaluminum or triethylaluminum.

21. A catalyst system useful in olefin polymerization, said catalyst system comprising the reaction product of a metallocene compound, a solid organoaluminoxy product, and an organometal compound represented by the formula $R_mEX_n$, where R is a hydrocarbyl radical having 1 to 20 carbon atoms, E is Mg, Al, B, Ga, or Zn, X is hydride, halide, —OR' wherein R' is an alkyl radical containing 1 to 8 carbon atoms, or —NH$_2$, m is 1 to 3, n is 0 to 2, and the sum of m plus n equals the valence of E;

wherein said solid organoaluminoxy product is prepared by reacting an organoaluminoxane and an oxygen-containing compound selected from the group consisting of organo boroxines, organic peroxides, alkylene oxides, and organic carbonates;

wherein said organoaluminoxane is represented by the formulas:

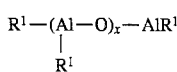

or

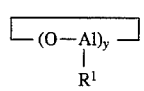

wherein each R is a hydrocarbyl radical containing 1 to 8 carbon atoms, n is 2 to 50, and m is 3 to 50.

22. A catalyst system useful in olefin polymerization, said catalyst system consisting essentially of the reaction product of a metallocene compound, a solid organoaluminoxy product, and an organometal compound represented by the formula $R_mEX_n$, where R is a hydrocarbyl radical having 1 to 20 carbon atoms, E is Mg, Al, B, Ga, or Zn, X is hydride halide, —OR' wherein R' is an alkyl radical containing 1 to 8 carbon atoms, or —NH$_2$, m is 1 to 3, n is 0 to 2, and the sum of m plus n equals the valence of E;

wherein said solid organoaluminoxy product is prepared by reacting an organoaluminoxane and an oxygen-containing compound selected from the group consisting of organo boroxines, organic peroxides, alkylene oxides, and organic carbonates; and wherein said organoaluminoxane is represented by the formulas:

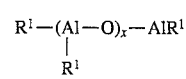

or

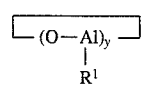

wherein each R is a hydrocarbyl radical containing 1 to 8 carbon atoms, x is 2 to 50, and y is 3 to 50.

23. A catalyst system according to claim 22 wherein said organo boroxine compounds are represented by the formula $(R^2BO)_3$ wherein $R^2$ is selected from the group consisting of hydrocarbyl radicals containing 1 to 25 carbon atoms, R"O—, R"S—, R"$_2$N—, R"$_2$P—, and R"$_3$Si—, wherein each R" is a hydrocarbyl radical containing 1 to 10 carbon atoms;

wherein said organic borane compounds contain a functionality represented by the formula

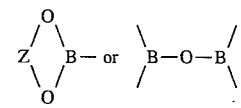

where Z is a bridging unit selected from the group consisting of $(CR^3{}_2)_q$, arylene, and $(YR^3{}_s)_q$, wherein each $R^3$ is individually selected from hydrogen and hydrocarbyl radicals having 1 to 20 carbon atoms; s and q are integers in the range of 1 to 10; and each Y is individually selected from C, Si, Ge, Sn, B Ga, In, P, As, and Sb, with the proviso that at least one Y is not C;

wherein said organic peroxides are represented by the formula $R^4OOR^5$, wherein $R^4$ and $R^5$ are individually selected from hydrogen, hydrocarbyl, and hydrocarbonyl radicals selected from the group consisting of alkyl, cycloalkyl, aryl, alkenyl, and alkynyl radicals containing 1 to 24 carbon atoms, with the proviso that at least one of $R^4$ and $R^5$ is a hydrocarbyl radical or hydrocarbonyl radical;

wherein said alkylene oxides contain 2 to 16 carbon atoms and contain the following functionality

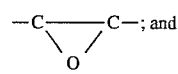

wherein said organic carbonates contain the functionality

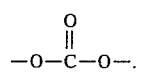

* * * * *

UNITED STATES PATENT AND TRADEMARK OFFICE
CERTIFICATE OF CORRECTION

PATENT NO.    : 5,496,781

DATED         : March 5, 1996

INVENTOR(S)   : Rolf L. Geerts et al.

It is certified that error appears in the above-identified patent and that said Letters Patent is hereby corrected as shown below:

Column 14, claim 22, line 1, a comma should be inserted between "hydride" and "halide".

Column 14, claim 23, line 30, lines 30-45 should be deleted

Signed and Sealed this

Thirteenth Day of May, 1997

Attest:

BRUCE LEHMAN

Attesting Officer    Commissioner of Patents and Trademarks